United States Patent
Yang

(10) Patent No.: US 11,898,698 B2
(45) Date of Patent: Feb. 13, 2024

(54) HIGH PRESSURE-GENERATING MULTI-POINT LUBRICANT INJECTOR

(71) Applicant: KLT CO., LTD., Paju-si (KR)

(72) Inventor: Tae Im Yang, Seoul (KR)

(73) Assignee: KLT CO, LTD. (KR)

( * ) Notice: Subject to any disclaimer, the term of this patent is extended or adjusted under 35 U.S.C. 154(b) by 0 days.

(21) Appl. No.: 18/083,754

(22) Filed: Dec. 19, 2022

(65) Prior Publication Data
US 2023/0140796 A1    May 4, 2023

Related U.S. Application Data

(63) Continuation of application No. PCT/KR2021/007382, filed on Jun. 14, 2021.

(30) Foreign Application Priority Data

Jul. 17, 2020    (KR) .................. 10-2020-0088830

(51) Int. Cl.
*F16N 7/14*    (2006.01)

(52) U.S. Cl.
CPC .................................. *F16N 7/14* (2013.01)

(58) Field of Classification Search
CPC ............. F16N 7/14; F16N 11/08; F16N 25/04
USPC ................... 184/25, 27.1, 37, 105.1, 6.1, 26
See application file for complete search history.

(56) References Cited

U.S. PATENT DOCUMENTS

| | | | | |
|---|---|---|---|---|
| 5,271,528 A | * | 12/1993 | Chien ................. | F16N 11/08 222/326 |
| 5,634,531 A | * | 6/1997 | Graf .................... | F16N 29/00 184/7.4 |
| 6,125,969 A | * | 10/2000 | Graf .................... | F16N 11/08 184/26 |
| 6,216,822 B1 | * | 4/2001 | May .................... | F16N 11/08 184/26 |
| 6,561,316 B1 | * | 5/2003 | Graf .................... | F16N 29/02 184/38.4 |
| 9,004,228 B2 | * | 4/2015 | Hildenbrand ....... | F16N 19/00 184/26 |
| 9,151,443 B2 | * | 10/2015 | Orlitzky ............. | F16N 11/08 |
| 9,458,964 B2 | * | 10/2016 | Eisenbacher ....... | F16N 11/08 |

(Continued)

FOREIGN PATENT DOCUMENTS

| | | |
|---|---|---|
| JP | 09-178087 A | 7/1997 |
| KR | 10-0382195 B1 | 5/2003 |

(Continued)

OTHER PUBLICATIONS

Korean Office Action (KR 10-2020-0088830), KIPO, dated Aug. 2, 2021.

(Continued)

*Primary Examiner* — Michael R Mansen
*Assistant Examiner* — Mark K Buse
(74) *Attorney, Agent, or Firm* — Park & Associates IP Law Office

(57) ABSTRACT

Proposed is a high pressure-generating multi-point lubricant injector that enables smooth discharge of a lubricant by uniformly pressurizing a piston with a single power source, and enables active use in multiple injection points, as well as efficient distribution of the lubricant to a drive end and a non-drive end.

5 Claims, 2 Drawing Sheets

(56) References Cited

U.S. PATENT DOCUMENTS

| | | | | |
|---|---|---|---|---|
| 2002/0079335 A1* | 6/2002 | Kramer | .................. | F16N 11/08 |
| | | | | 222/333 |
| 2010/0181327 A1* | 7/2010 | Kanda | .................. | B65D 1/0292 |
| | | | | 220/601 |
| 2014/0374449 A1* | 12/2014 | Eisenbacher | .......... | F16N 11/08 |
| | | | | 222/333 |
| 2020/0049310 A1 | 2/2020 | Lisby et al. | | |

FOREIGN PATENT DOCUMENTS

| | | |
|---|---|---|
| KR | 10-2014-0109960 A | 9/2014 |
| KR | 10-1604062 B2 | 3/2016 |

OTHER PUBLICATIONS

International Search Report (PCT/KR2021/007382), WIPO, dated Sep. 24, 2021.
Korean Notice of Allowance (KR 10-2020-0088830), KIPO, dated Sep. 30, 2021.

* cited by examiner

HIGH PRESSURE-GENERATING MULTI-POINT LUBRICANT INJECTOR

REFERENCE TO RELATED APPLICATIONS

This is a continuation of International Patent Application PCT/KR2021/007382 filed on Jun. 14, 2021, which designates the United States and claims priority of Korean Patent Application No. 10-2020-0088830 filed on Jul. 17, 2020, the entire contents of which are incorporated herein by reference.

FIELD OF THE INVENTION

The present disclosure relates generally to a lubricant injector. More particularly, the present disclosure relates to a high pressure-generating multi-point lubricant injector installed where lubrication is required due to mechanical friction and capable of automatically injecting a lubricant.

BACKGROUND OF THE INVENTION

There are many lubricant injectors that inject a lubricant to where lubrication is required, that is, where mechanical friction occurs in general industrial machinery components such as bearings. With repeated technological advances, various types of mechanical injectors have been widely spread and used in many industries.

Here, an automatic mechanical lubricant injector refers to a device that supplies a lubricant to a point where lubrication is required, such as a bearing, in such a manner that as a screw shaft is rotated using a motor driven by a battery, a piston is moved downward, thereby causing the lubricant to be discharged to the outside.

Early products were generally used for lubrication in a single injection point at a low pressure of 5 kg/cm2. Since the development of an injector operating at a high pressure of 20 kg/cm2 or more, it has been widely used for lubrication in multi-points, that is, multiple injection points.

In the case of a lubricant injector used in a single injection point at a low pressure of 5 $kg/cm^2$, production cost is relatively low and components are simple. Despite these many advantages, problems remain. That is, such a low pressure may make it impossible to effectively discharge a lubricant even when a small back pressure is applied to an oil supply area. Also, the product itself may be permanently damaged without overcoming the back pressure, or a discharge function may be often no longer performed due to buckling of the used screw shaft.

In addition, even when it fails to inject the lubricant into the bearing due to such damage, the injector may appear to operate normally to workers, so the bearing may be left unattended for a long period of time without the lubricant being supplied and ultimately be damaged.

Meanwhile, in the case of a lubricant injector operated at a high pressure of 20 $kg/cm^2$ or more, it has excellent advantages in terms of reliability, performance, and efficiency, such as being able to overcome the back pressure generated from the bearing and being able to be installed remotely thereby widening its range of application.

However, in order to manufacture such a high-pressure lubricant injector, production cost is inevitably high because components of a pump, which is a high-pressure generator, are very complex and precise control is required to satisfy various conditions. Sometimes, there is also a possibility that malfunctions may occur in precise control in harsh installation environments.

Meanwhile, in both case of low-pressure and high-pressure lubricant injectors, when the lubricant stays for a long period of time under pressure in a container, serious oil separation may occur, so lubricant injection cannot be smoothly performed. In particular, in the case of the high-pressure lubricant injector, a divide block is used to inject the lubricant into multiple injection points. When the divide block is left unattended for a long period of time in a state in which the lubricant leaks therefrom, the lubricant may harden in the divide block and a connection tube, ultimately causing a problem in lubricant injection.

Such an oil separation phenomenon is more noticeable in the case of the low-pressure lubricant injector. Thus, when oil separation occurs, the entire amount of lubricant may escape through an open lower through-hole and only a very dry and non-viscous lubricant thickener may accumulate inside the injector. When the motor continues to rotate thereafter, the junction between the piston and the screw shaft may be eventually damaged or the screw shaft itself may be buckled, resulting in a state in which lubricant discharge is impossible.

Meanwhile, when an excessive back pressure is applied to the oil supply area, the piston cannot no longer be lowered and the screw shaft is lifted instead. At this time, when the motor continues to operate, such an upward movement of the screw shaft may increase rotational friction between a driven gear and an inner wall of the injector. Consequently, consumption due to such friction leads to power consumption, this in turn causing power loss of the battery and furthermore leading to damage to the injector made of a plastic material.

In addition, when one screw shaft is coupled to the piston and pressure is not uniformly applied to the entire area of the piston, the piston may be lowered in a state of being displaced from an equilibrium position and become stuck in the injector, so lubricant discharge cannot be smoothly performed.

Meanwhile, in the case of an electric motor, it is generally divided into a drive end where a large load is applied and a non-drive end where a relatively small load is applied. In the case of the drive end, since a more load is applied than the non-drive end, the size of a bearing is relatively large and the amount of lubricant consumed is relatively large.

Injectors may be attached to the drive end and the non-drive end of the motor. In this case, the drive-end injector and the non-drive end injector may have different amount of lubricant injection by differently setting the injection completion time to be, for example, nine months for the drive-end injector and twelve months for the non-drive end injector. However, since the replacement times of the injectors are different even when they are installed on the same motor, this causes inconvenience in terms of management.

Due to such difficulty in management, not only the drive-end injector but also the non-drive end injector are replaced together after nine months in some cases. In this case, since the lubricant remaining in the non-drive end injector is discarded even though it is still usable up to twelve months, the unused lubricant is wasted.

In addition, when the same injection completion time, for example, nine months or twelve months, is set for both the drive-end injector and the non-drive end injector, a relatively large amount of lubricant is injected into the non-drive end, or a relatively small amount of lubricant is injected into the drive-end. Due to such lack or excess of the lubricant, heat may be generated in the bearing, ultimately causing damage to the bearing.

Meanwhile, thanks to technology development in the 4th industrial era, equipment is becoming miniaturized and highly efficient. Along with this trend, many driving parts have been developed in a form in which there exist multiple injection points using small bearings. In particular, in a part such as an LM block, which is the most basic mechanical element of automation, there exist multiple points where only a small amount of lubrication is required.

In such a case, attaching each lubricant injector individually to each point requires a large installation space and is economically inefficient. This sometimes creates an atmosphere of reluctance to automation in the field.

The conventional lubricant injectors described above have a limitation in actively coping with variables such as low pressure and high pressure, drive-end and non-drive end, single injection point and multiple injection points, etc. Thus, there is an urgent need to develop a technology that can solve the above problems.

SUMMARY OF THE INVENTION

Accordingly, the present disclosure has been made keeping in mind the above problems occurring in the related art, and an objective of the present disclosure is to provide a high pressure-generating multi-point lubricant injector that enables a lubricant to be smoothly discharged by uniformly pressurizing a piston with a single power source.

Another objective of the present disclosure is to provide a high pressure-generating multi-point lubricant injector that enables active use in multi-points, that is, multiple injection points, with a single power source without requiring the use of a separate divide block, and enables efficient distribution of a lubricant to a drive end and a non-drive end.

In order to accomplish the above objectives, according to one aspect of the present disclosure, there is provided a high pressure-generating multi-point lubricant injector including: an upper body in which a motor and a battery for driving the motor are mounted; and a lower body coupled to the upper body, the lower body including a storage compartment filled with a lubricant therein, a piston provided inside the storage compartment and including a nut, a screw shaft coupled to the nut and configured to lift and lower the piston while being rotated, a driven gear coupled to the screw shaft, and a driving gear configured to drive the driven gear by receiving rotational force of the motor, wherein the driven gear may include multiple driven gears arranged symmetrically around the driving gear located at an upper center of the lower body, the screw shaft may include multiple screw shafts provided at positions corresponding to the driven gears, and the nut may include multiple nuts coupled to the screw shafts and provided at positions corresponding to the driven gears so that the piston extrudes the lubricant to the outside by uniformly receiving the rotational force of the motor.

According to another aspect of the present disclosure, there is provided a high pressure-generating multi-point lubricant injector including: an upper body in which a motor and a battery for driving the motor are mounted; and a lower body coupled to the upper body, the lower body including a space of a predetermined size, a cartridge detachably mounted in the space and filled with a lubricant therein, a piston provided inside the cartridge and including a nut, a screw shaft coupled to the nut, configured to lift and lower the piston while being rotated, and formed through an upper portion of the cartridge, a driven gear coupled to the screw shaft, and a driving gear configured to drive the driven gear by receiving rotational force of the motor, wherein the driven gear may include multiple driven gears arranged symmetrically around the driving gear located at an upper center of the lower body, the screw shaft may include multiple screw shafts arranged at positions corresponding to the driven gears, and the cartridge may include multiple cartridges each including the piston coupled to each of the screw shafts and arranged at positions corresponding to the driven gears so that the lubricant is extruded to the outside from each of the multiple cartridges.

To this end, the multiple cartridges may have the same or different cross-sectional areas.

Furthermore, the lubricant may be extruded to the outside through a through-hole, the through hole may be formed in a separate base, and the base may be coupled to the lower body.

Furthermore, a steel plate may be provided above the driven gear, and a steel ball may be provided between the steel plate and the driven gear to make contact with the steel plate.

According to the present disclosure having the above-described configuration, the following effects are obtained.

In a conventional lubricant injector, when only a thickener with little viscosity accumulates due to oil separation and a motor continues to rotate in this state to extrude a lubricant, the junction between a piston and a screw shaft is damaged or the screw shaft is buckled, resulting in a state in which lubricant discharge is impossible. The present disclosure can fundamentally solve this problem, thereby improving reliability of the lubricant injector.

In addition, since a piston can be pressurized uniformly by driving of a motor, the piston can be prevented from being displaced from an equilibrium position and becoming stuck in the injector, thereby enabling smooth discharge of the lubricant to the outside.

Next, the present disclosure can be actively used in multiple injection points through a single lubricant injector without requiring the use of a separate divide block. Also, when applied to an electric motor that requires different lubricant supply amounts for a drive end and a non-drive end, the present disclosure can effectively satisfy the required supply amounts for the electric motor by only setting different capacities of cartridges.

Furthermore, it is possible to provide an efficient structure capable of maximally suppressing battery power loss while maximally reducing power consumption caused by friction even under excessive back pressure.

Considering that, in general, when a lubricant is not smoothly supplied to bearings, not only a driving source such as an electric motor but also the entire system using the driving source may stop, the present disclosure is very advantageous in terms of reliability.

The above and other effects of the present disclosure will be encompassed widely in the scope of the present disclosure by not only the above-described embodiments and the descriptions in the appended claims, but also effects that can occur within the scope of the present disclosure that can be easily inferred therefrom and possibilities of potential advantages contributing to industrial development.

DETAILED DESCRIPTION OF THE INVENTION

Hereinafter, exemplary embodiments of the present disclosure will be described in detail with reference to the accompanying drawings.

Embodiment 1

Figure 1:
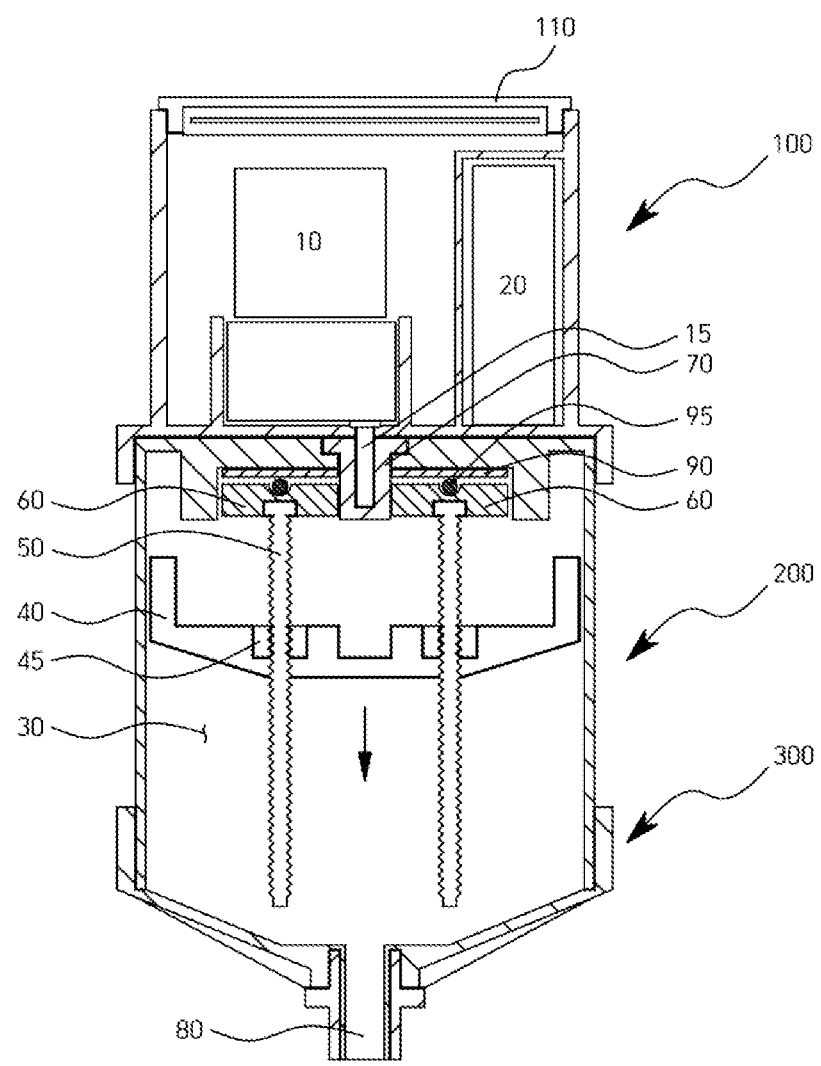
FIG. 1 is a view illustrating an internal structure according to an embodiment of the present disclosure.

First, an exemplary embodiment of the present disclosure will be described with reference to FIG. 1. Here, FIG. 1 is to be understood as a drawing for better illustrating an internal coupling relationship.

The present disclosure is largely composed of an upper body 100 and a lower body 200 coupled to the upper body 100.

Here, the upper body 100 has a motor 10 and a battery 20 for driving the motor 10 mounted therein. In addition, the upper body 100 includes a cover 110 made of a transparent material.

The reason why the cover 110 is made of a transparent material is to enable a manager to easily check whether an injector operates normally through the transparent cover 110 from anywhere by installing a green LED blinking during normal operation and a red LED blinking during abnormal operation are installed on a circuit board (not illustrated) for controlling the motor 10 and the like inside the injector.

Next, the lower body 200 is coupled to the upper body 100 under the upper body 100. The coupling of the upper and lower bodies 100 and 200 is preferably achieved in a manner such as screw coupling so that they can be easily attached and detached from each other.

Here, the lower body 200 includes a storage compartment 30, a piston 40, a screw shaft 50, a driven gear 60, and a driving gear 70.

First, the storage compartment 30 refers to a space filled with a lubricant, that is, a space formed by a cylindrical casing of a predetermined size. The piston 40 is configured to pressurize the lubricant inside the storage compartment 30 while being lowered, and includes a nut 45.

The screw shaft 50 is coupled to the nut 45 and is configured to lift and lower the piston 40 while being rotated. The screw shaft 50 is coupled to the driven gear 60 that is rotated by the driving gear 70 driven by receiving rotational force of a motor 10.

In other words, when the motor 10 is rotated, the driving gear 70 is rotated and the driven gear 60 coupled to the driving gear 70 is rotated in conjunction therewith, thereby causing the screw shaft 50 to be rotated. As a result, the piston 40 is lifted and lowered by the nut 45 coupled to the screw shaft 50.

Here, a means for adjusting rotation ratio may be further provided between the motor 10 and the driving gear 70. The rotational force of the motor 10 is transmitted to the driving gear 70 through the means and a driving shaft 15.

A through-hole 80 for extruding the lubricant to the outside is formed on a lower side of the lower body 200.

Meanwhile, according to an embodiment of the present disclosure, multiple driven gears 60 are arranged symmetrically around the driving gear 70 located in the upper center of the lower body 200.

Here, the number of the driven gears 60 is preferably two at 180 degree intervals or four at 90 degree intervals around the driving gear 70.

Accordingly, multiple screw shafts 50 and multiple nuts 45 coupled to the screw shafts 50 are provided at positions corresponding to the driven gears 60.

With such a configuration, when the motor 10 is rotated, the driving gear 70 is rotated through the driving shaft 15 and the multiple driven gears 60 are rotated simultaneously in conjunction with the rotation of the driving gear 70. As a result, as the multiple screw shafts 50 rotated at the same speed as the driven gears 60 uniformly pressurize the piston 40, the rotational force of the motor 10 is uniformly transmitted to the piston 40, thereby causing the piston 40 to be lifted and lowered at a constant speed.

In other words, since such an upward and downward movement of the piston 40 is achieved by uniformly pressurizing the piston 40 with one motor 10, that is, a single power source, the piston 40 is prevented from being displaced from an equilibrium position and becoming stuck in the lower body 200, thereby enabling smooth extrusion of the lubricant to the outside.

In addition, since the multiple screw shafts 50 are provided corresponding to the number of the driven gears 60, it is possible to provide a more robust structure capable of preventing conventional problems of damage to the junction between the piston 40 and the screw shafts 50 or buckling of the screw shafts 50, which are caused by oil separation. Thus, it is possible to improve reliability of a lubricant injector.

Embodiment 2

Another exemplary embodiment of the present disclosure will be described with reference to FIG. 2.

Figure 2:
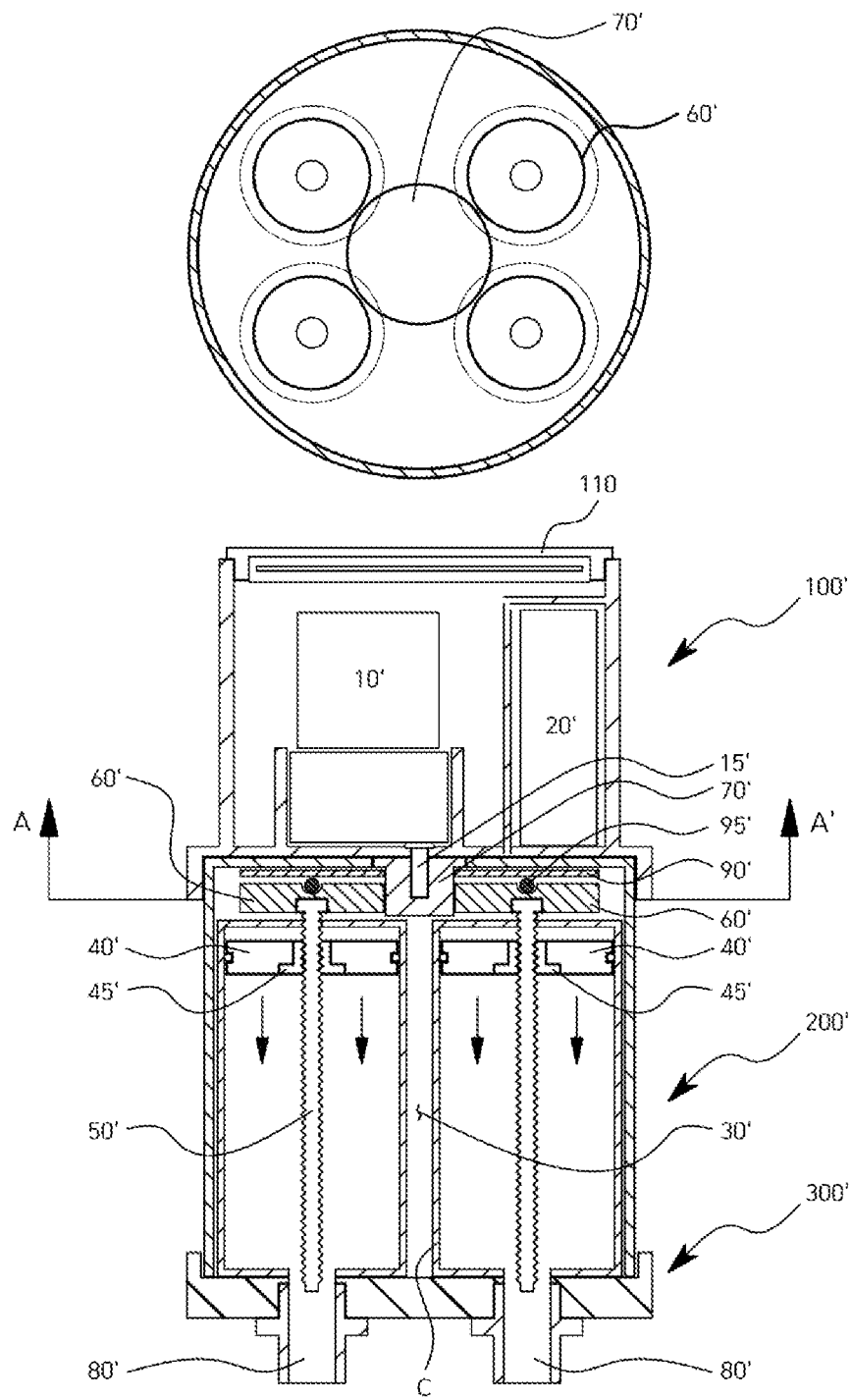
FIG. 2 is a view illustrating an internal structure according to another embodiment of the present disclosure and an A-A' cross section.

Here, FIG. 2 is also to be understood as a drawing for better illustrating an internal coupling relationship. A view at the lower side is a front view, and a view at the lower the upper side is a cross-sectional view taken along line A-A' of the front view.

The present disclosure is largely composed of an upper body 100' and a lower body 200' coupled to the upper body 100'.

Here, the upper body 100' has a motor 10' and a battery 20' for driving the motor 10' therein. In addition, the upper body 100' includes a cover 110 made of a transparent material.

As described above, the reason why the cover 110 is made of a transparent material is to enable a manager to easily check whether an injector operates normally through the transparent cover 110 from anywhere.

Next, the lower body 200' is coupled to the upper body 100' under the upper body 100'. The coupling of the upper and lower bodies 100' and 200' is preferably achieved in a manner such as screw coupling so that they can be easily attached and detached from each other.

Here, the lower body 200' includes a space 30', a cartridge C, a piston 40', a screw shaft 50', a driven gear 60', and a driving gear 70'.

First, the space 30' refers to a space formed by a cylindrical casing of a predetermined size. The cartridge C is located in the space 30' and filled with a lubricant therein. In the present disclosure, the cartridge C should be interpreted as a small container detachably mounted in the space 30'.

With the cartridge C formed as a small container and easy to replace, a lubricant injector according to the present disclosure can be reused as long as the lubricant is filled in the cartridge C after lubricant injection is completed. In addition, during continuous use in harsh conditions, in the case of a conventional lubricant injector, the injector itself that withstands pressure may be damaged and become unusable. However, in the case of the present disclosure, since each cartridge C withstands pressure, even when the cartridge C is damaged, the lubricant injector can be reused by replacing only the corresponding cartridge C. Thus, it is possible to significantly extend lifespan of the lubricant injector.

Next, the piston 40' including a nut 45' is provided inside the cartridge C. The piston 40' is configured to pressurize the lubricant inside the cartridge C while being lowered, and includes the nut 45'.

The screw shaft 50' is coupled to the nut 45' and is configured to lift and lower the piston 40 while being rotated. As illustrated, the screw shaft 50' is formed through an upper portion of the cartridge C. An end of the screw shaft 50' is coupled to the driven gear 60' that is rotated by the driving gear 70' driven by receiving rotational force of the motor 10'.

In other words, when the motor 10' is rotated, the driving gear 70' is rotated and the driven gear 60' coupled to the driving gear 70' is rotated in conjunction therewith, thereby causing the screw shaft 50' to be rotated. As a result, the piston 40' is lifted and lowered by the nut 45' coupled to the screw shaft 50'.

Meanwhile, according to another embodiment of the present disclosure, multiple driven gears 60' are arranged symmetrically around the driving gear 70' located in the upper center of the lower body 200'.

Here, the number of the driven gears 60' may be two to four at regular angular intervals around the driving gear 70'. Two at 180 degree intervals around the driving gear 70' is preferable, or as illustrated in FIG. 2, four at 90 degree intervals is most preferable in terms of space efficiency.

Accordingly, multiple screw shafts 50' and multiple cartridges C each including the piston 40' coupled to each of the screw shafts 50' are arranged at positions corresponding to the driven gears 60' at regular intervals.

With such a configuration, when the motor 10' is rotated, the driving gear 70' is rotated through the driving shaft 15' and the multiple driven gears 60' are rotated simultaneously in conjunction with the rotation of the driving gear 70'. As a result, the rotational force of the motor 10' is transmitted to the respective pistons 40' inside the cartridges C through the screw shafts 50' rotated at the same speed as the driven gears 60', thereby causing the pistons 40' to be lowered to extrude the filled lubricant to the outside.

The lubricant is extruded from each of the multiple cartridges C to the outside. To this end, a lower portion of each of the cartridges C is partially open to communicate with a through-hole 80' for extruding the lubricant to the outside.

Thus, it is possible to distribute and supply the lubricant to multiple injection points as many as the number of the cartridges C provided. In particular, since multiple injection points exist in a part such as an LM Block, which is the most basic mechanical element of automation, when the lubricant injector according to the present disclosure is used, it is possible to effectively supply the lubricant to the multiple injection points without requiring the use of a separate divide block. Furthermore, it is possible to eliminate the need to install one injector for each injection point, thereby achieving excellent space utilization efficiency of the entire device.

Meanwhile, according to the present disclosure, the multiple cartridges C may be configured to have the same cross-sectional area, that is, the same capacity, so that each of the cartridges C discharges an equal amount of lubricant on the same time basis. However, in some cases, the cartridges C may be configured to have different cross-sectional areas, that is, different capacities.

As described above, in the case of an electric motor, it is generally divided into a drive end where a large load is applied and a non-drive end where a relatively small load is applied. In the case of the drive end, since a more load is applied than the non-drive end, the size of a bearing is relatively large and the amount of lubricant consumed is relatively large. Specifically, the ratio of lubricant consumed between the drive end and the non-drive end is about 10:7.

To cope with this, when the ratio of cross-sectional area between the cartridges C, that is, the ratio of capacity between the cartridges C, is set to 10:7, which is the ratio of lubricant consumed between the drive end and the non-drive end, it is possible to completely satisfy a required supply amount for the electric motor, thereby solving the problem caused by different replacement times.

Thus, the lubricant injector according to the present disclosure can be actively used in multiple injection points with a single power source without requiring the use of a separate divide block, and can efficiently distribute the lubricant to the drive end and the non-drive end.

Meanwhile, in the case of the lubricant injector according to the present disclosure, the through-holes 80 and 80' may be provided directly in the lower bodies 200 and 200'. That is, in the case of Embodiment 1, the lubricant is discharged to the outside through one through-hole 80 as illustrated in FIG. 1, and in the case of Embodiment 2, the lubricant is discharged to the outside through through-holes 80' provided in number corresponding to the cartridges C as illustrated in FIG. 2. However, it is preferable in terms of manufacturing and maintenance that the through-holes 80 and 80' are formed in separate bases 300 and 300' and these bases 300 and 300' are coupled to the lower bodies 200 and 200'.

Here, the coupling of the bases 300 and 300' to the lower bodies 200 and 200' is preferably achieved in a manner such as screw coupling so that they can be easily attached and detached from each other.

As described above, while there is one through-hole through which the lubricant is extruded to the outside in Embodiment 1, there are 2 to 4 through-holes through which the lubricant is extruded to the outside in Embodiment 2. Thus, it is possible to actively respond to various numbers of injection points with a single lubricant injector by varying the number of the through-holes.

Meanwhile, according to the present disclosure, as illustrated in FIGS. 1 and 2, separate steel plates 90 and 90' are provided above the driven gears 60 and 60', respectively, and steel balls 95 and 95' for making contact with the steel plates 90 and 90' are provided between the steel plates 90 and 90' and the driven gears 60 and 60'

To this end, a seat recess (not illustrated) is preferably formed in the upper center of each of the driven gears 60 and 60' so that the steel balls 95 and 95' are seated in the respective seat recesses to make contact with the steel plates 90 and 90'.

The steel plates 90 and 90' have a circular shape with a predetermined thickness. The steel plates 90 and 90' are positioned between above the driven gears 60 and 60' and upper inner surfaces of the lower bodies 200 and 200', more preferably upper inner surfaces of the casings forming the storage compartment 30 or the space 30'. In some cases, the steel plates 90 and 90' may be attached to the upper inner surfaces of the casing with an adhesive, or may be inserted into recesses of a predetermined depth formed in the upper inner surfaces of the casings.

Conventionally, when an excessive back pressure is applied to an oil supply area, the pistons 40 and 40' cannot no longer be lowered and the screw shafts 50 and 50' are lifted instead. At this time, when the motors 10 and 10' continue to operate, such an upward movement of the screw shafts 50 and 50' causes the driven gears 60 and 60' to pressurize the upper inner surfaces of the lower bodies 200 and 200', more preferably, the upper inner surfaces of the casings forming the storage compartment 30 and the space 30' with great force.

Consequently, as rotational friction of the driven gears 60 and 60' is increased, consumption due to such friction leads to power consumption, this in turn causing power loss of the batteries 20 and 20'.

However, in the case of the present disclosure, since the steel balls 95 and 95' make direct contact with the steel plates 90 and 90', power loss caused by friction can be reduced as much as possible by changing a contact state from a surface contact to a point contact. Furthermore, since the steel balls 95 and 95' are movable on the steel plates 90 and 90', load can be uniformly distributed throughout the steel plates 90 and 90'.

In addition, when the driven gears 60 and 60' are rotated, the steel balls 95 and 95' play the same role as bearing balls, so that rotational friction can be reduced as much as possible.

Therefore, it is possible to provide an efficient structure capable of maximally suppressing battery power loss while maximally reducing power consumption caused by friction even under excessive back pressure, and to distribute concentrated load throughout the steel plates, thereby preventing damage to the injector made of a plastic material.

As described above, the present disclosure has a technical feature of providing a lubricant injector that enables smooth discharge of a lubricant by uniformly pressurizing the piston with a single power source, enables active use in multiple injection points with a single power source, enables efficient distribution of the lubricant to the drive end and the non-drive end, and enables suppression of power loss caused by friction.

While the exemplary embodiments of the present disclosure have been described above for illustrative purposes, those skilled in the art will appreciate that various modifications, additions, and substitutions are possible, without departing from the scope and spirit of the present disclosure as disclosed in the accompanying claims.

What is claimed is:

1. A high pressure-generating multi-point lubricant injector comprising:
    an upper body in which a motor and a battery for driving the motor are mounted; and
    a lower body coupled to the upper body, the lower body comprising
    a storage compartment filled with a lubricant therein,
    a piston provided inside the storage compartment and comprising a nut,
    a screw shaft coupled to the nut and configured to lift and lower the piston while being rotated,
    a driven gear coupled to the screw shaft, and
    a driving gear configured to drive the driven gear by receiving rotational force of the motor,
    wherein the driven gear comprises multiple driven gears arranged symmetrically around the driving gear located at an upper center of the lower body, the screw shaft comprises multiple screw shafts provided at positions corresponding to the driven gears, and the nut comprises multiple nuts coupled to the screw shafts and provided at positions corresponding to the driven gears so that the piston extrudes the lubricant to the outside by uniformly receiving the rotational force of the motor.

2. The high pressure-generating multi-point lubricant injector of claim 1, wherein the lubricant is extruded to the outside through a through-hole, the through hole is formed in a separate base, and the base is coupled to the lower body.

3. The high pressure-generating multi-point lubricant injector of claim 1, wherein a steel plate is provided above the driven gear, and a steel ball is provided between the steel plate and the driven gear to make contact with the steel plate.

4. A high pressure-generating multi-point lubricant injector comprising:
    an upper body in which a motor and a battery for driving the motor are mounted; and
    a lower body coupled to the upper body, the lower body comprising
    a space of a predetermined size,
    a cartridge detachably mounted in the space and filled with a lubricant therein,
    a piston provided inside the cartridge and comprising a nut,
    a screw shaft coupled to the nut, configured to lift and lower the piston while being rotated, and formed through an upper portion of the cartridge,
    a driven gear coupled to the screw shaft, and
    a driving gear configured to drive the driven gear by receiving rotational force of the motor,
    wherein the driven gear comprises multiple driven gears arranged symmetrically around the driving gear located at an upper center of the lower body, the screw shaft comprises multiple screw shafts arranged at positions corresponding to the driven gears, and the cartridge comprises multiple cartridges each including the piston coupled to each of the screw shafts and arranged at positions corresponding to the driven gears so that the lubricant is extruded to the outside from each of the multiple cartridges.

5. The high pressure-generating multi-point lubricant injector of claim 4, wherein the multiple cartridges have the same or different cross-sectional areas.

* * * * *